Oct. 11, 1960 G. LAUBE 2,956,122
SPACE FUNCTION RELEASE ARRANGEMENT
FOR PRINTING TELEGRAPH SYSTEM
Filed July 5, 1957 2 Sheets-Sheet 1

INVENTOR
G. Laube
BY
Albert Peiro
ATTORNEY

Oct. 11, 1960 | G. LAUBE | 2,956,122

SPACE FUNCTION RELEASE ARRANGEMENT FOR PRINTING TELEGRAPH SYSTEM

Filed July 5, 1957 | 2 Sheets-Sheet 2

INVENTOR

G. Laube

BY

Albert Leiss

ATTORNEY

United States Patent Office 2,956,122

Patented Oct. 11, 1960

2,956,122

SPACE FUNCTION RELEASE ARRANGEMENT FOR PRINTING TELEGRAPH SYSTEM

Gerd Laube, Karlsruhe, Germany, assignor to International Standard Electric Corporation, New York, N.Y., a corporation of Delaware Filed July 5, 1957, Ser. No. 670,017

Claims priority, application Germany July 13, 1956

5 Claims. (Cl. 178—33)

This invention relates to improvements in printing telegraph apparatus and more particularly to printing telegraph receivers.

In the printing telegraph art, telegraph code combinations are transmitted and received, which combinations correspond to letters of the alphabet, numbers, and several miscellaneous symbols in common use. In addition, other code combinations are transmitted which correspond to special functions to be performed by the receiver such as "letter shift," "figures shift" and in page printers "line feed," etc. This invention contemplates the transmission of code combinations corresponding to a common function immediately followed by a transmission of a code combination corresponding to a particular letter. It is sometimes required to release an additional function of a telegraph receiving apparatus such, for instance, as in the case of a system utilizing two tape transmitters which alternately transmit telegraph messages from perforated tapes; the system operating so that a complete telegraph message is transmitted from one tape transmitter and then the other transmitter transmits a message alternately over a common line thus means must be provided for alternately starting and stopping one transmitter. The control for alternate operation of these tape transmitters must be in response to a particular control signal which, however, should not be transmitted over the lines of the receiving station as part of the text of the message.

Accordingly, the invention solves the problem of controlling two tape transmitters in response to a particular control signal and utilizes the local receiver to alternately control the operation of the two tape transmitters by means of a two-way switch.

My invention contemplates the modification of the receiver to respond to a particular group of code combinations and which thereupon alternately switches over the transmitters. It is a further object of the invention to selectively control the operation of two tape transmitters upon the receipt of a predetermined sequence of code combinations consisting of a particular function followed by a particular letter.

It is a further object of the invention to provide a device which is capable of normally responding to the code combination of the aforesaid particular function when it is not followed by the particular letter.

It is still a further object of the invention to provide a structure which will respond normally to the particular letter except when preceded by the particular function.

It is a further object of the invention to provide a structure for selectively controlling two tape transmitters upon the receipt of a particular function followed by a particular letter and preventing the printing of the combination corresponding to the said function and letter at the distant receiver.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
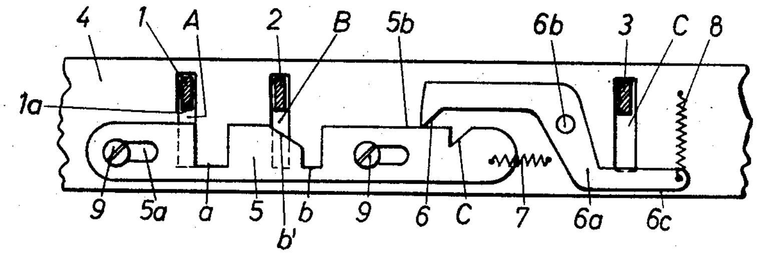
Fig. 1 is a schematic plan view of a portion of a page printer modified in accordance with the invention, and shown in the normal position whereby a switch controlled thereby is in a first position.
Figure 5:
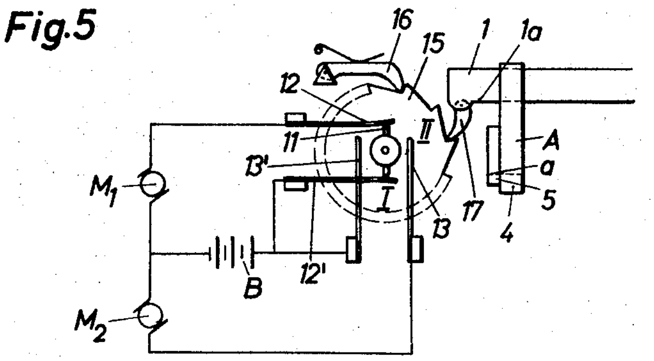
Fig. 5 is a schematic showing of a portion of a page printer motor control circuit showing its modification according to the invention.

Referring now to Fig. 1, there is shown schematically a portion of a page printer adapted to respond to printing telegraph signals from either a local source of signals such as a pair of tape transmitters or from a distant source of signals over a telegraph transmission line. The signalling mechanism of such a receiver is well known to those skilled in the art and includes a receiving magnet which responds to current impulses which may be mark signals and by its deenergized condition responds to space signals. The magnet controls an armature which effects the setting of so-called "swords" which in turn control the setting of vanes. These vanes are retained in their position, until after the printing of the selected signal combination, by the action of a function lever-locking. The functions, such as "Line Feed," are selected, by the function combs attached to the function levers, in such a way that by the action of the function combs, upon engagement of the function levers, the vanes will be displaced, or aligned. The invention utilizes extension portions on the function levers allocated to the line feed function, to a particular letter and to the locking. As will be seen in the drawing, there is shown a plan view of a portion of a page printer showing the extended top portion of a function lever 1, which is adapted to respond to the code combination corresponding to the letter "D." Adjacent the function lever 1 is shown the top portion of the function lever 2 which is adapted to respond to the code combination corresponding to the function "line feed." These function levers extend through slots A and B in the fixed mounting bar 4. It will be seen that the slots A and B are much wider than the width of the function levers 1 and 2. The function levers 1, 2 and 3 are longer than any of the other function levers associated with the other functions. There is slidably mounted on the mounting bar 4 a latching bar 5 by means of elongated slots 5*a* through which slots screws 9 penetrate to be fixed into the body of the mounting bar 4. The latching bar 5 is coupled to the mounting bar 4 at its right end by means of spring 7 and which spring normally urges the latching bar in a direction toward the right, as shown in Fig. 1. The latching bar is provided with a pair of spaced slots *a*, *b*. The slot *b* has a tapered corner *b'*, the purpose of which will be later explained. A ratchet tooth C is also cut into the surface of the latching bar 5 and which tooth is adapted to co-act with the pawl tooth 6, which extends from the left-hand end of the pawl lever 6*a* and which lever is pivotally mounted to the mounting bar 4 by means of pivot 6*b*. The lever 6*a* is adapted to be normally urged in a counter clockwise direction by means of the coupling spring 8, which spring is disposed between the mounting bar 4 and the direction *6c* of the lever *6a*. The side 1*a* of the function lever 1 for the letter "D," via a stepping pawl 17 (Fig. 5), cooperates with a ratchet wheel 15 which, by the action of a ratchet pawl 16, is retained in the respectively set position. This ratchet wheel 15 in such a way co-acts with a switch arm 11 that the latter, in position I, will electrically connect the fixed contact springs 12 and 12' with each other and, in position II, the fixed contact springs 13 and 13'. The switching from position I to position II, and from position II to position I, and so forth is effected by the movement of the function lever 1 in the slot A from its upper into its lower position. In the course of this the ratchet wheel 15 is correspondingly turned (in clockwise direction in Fig. 5) by the action of the stepping pawl 17. In the position shown in Fig. 1 and which corresponds to the switch position shown in Fig. 5, it will be seen that the switch arm 11 is maintained in contact with its fixed contact 12 and 12'. With the function lever 1 in the position shown in Fig. 3 the switch arm 11 is in contact with fixed contact 13 and 13'. There are further shown schematically two motors M1, M2 being the drive motors of two tape transmitters not otherwise shown. The motor M1 is connected to fixed contact springs 12 and 12' through the switch arm 11 with the battery B (position I Fig. 5). The motor M2 is connected to the fixed contact springs 13 and 13' through the switch arm 11 with the battery B (position II Fig. 5). The one terminal of battery B is connected to the fixed contact springs 12' and 13'. By means of this circuit, therefore, either motor may be made to operate depending upon the position of the switch arm 11.

The operation of the invention will now be described by the aid of Figs. 1–4. Fig. 1 represents a condition in the printing receiver wherein neither the particular signal "D" nor the line feed signal has been received. Consequently, the latching bar 5 is drawn to its extreme right-hand position by reason of the tension exercised by spring 7. In this condition the slot *a* in latching bar 5 is out of register with slot A in mounting bar 4. It should be noted that in this condition, the letter "D" may be printed if a code combination is received characteristic of said letter. It will also be noted that the inclined surface *b'* associated with slot *b* is directly in the path of the function lever 2. The pawl tooth 6 is out of association with the ratchet tooth C in the bar 5 and is maintained in abutment against the surface 5*b* of the bar 5 under control of the spring 8.

Figure 2:
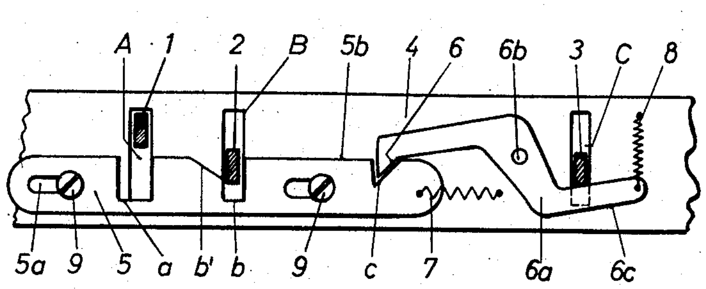
Fig. 2 is a schematic showing of the structure shown in Fig. 1 in the condition of having responded to the code combination corresponding to a particular function.
Figure 3:
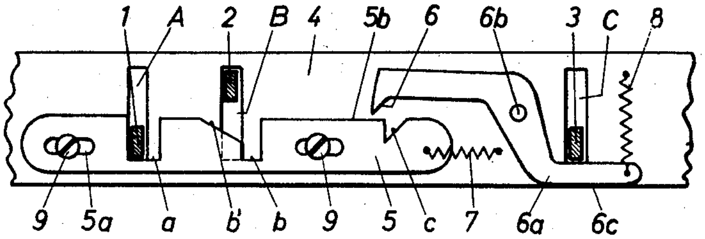
Fig. 3 is a schematic showing of the structure of Fig. 1 in the condition of having responded to the code combination corresponding to a particular letter after having responded to the function shown in Fig. 2, whereby a switch controlled thereby is shown in a second position.

Upon receipt of a line feed signal however, the function lever 2 will be urged in a direction toward the latching bar 5, as shown in Fig. 2 and will co-act with the inclined surface *b'* on the bar 5, causing the bar to move toward the left against the tension of spring 7. Immediately the pawl tooth 6 will fall into the ratchet tooth C to retain the latching bar 5 in its left-hand position when the function lever 2 is retracted at the conclusion of the line feed function signal. If now the code combination for the letter "D" is received the function lever 1 for the letter "D" will be moved along the length of slot A and will pass into the slot *a* of the latching bar 5, as shown in Fig. 3. When the function lever 1 has moved the distance from its position shown in Fig. 1 to the position shown in Fig. 3, it will cause the switch arm 11 to move from the contact 12 and 12' to the contact 13 and 13' thereby causing the disconnection of motor M2 from the source B and the alternate connection of the motor M1 to said source. Furthermore the printing for the letter "D" is suppressed at the movement of the function lever 1 for the letter "D," i.e. after the usual function vanes (not shown) are engaged by the comb (not shown) cut along the lower edge of this function lever 1. Upon completion of this process the function lever 1 will return to its normal position upon release of lever 6*a* in a manner to be later explained. Upon such release bar 5, under the tension of spring 7, will move towards the right and back into its normal position (Fig. 1). Following each code combination the unlocking function lever 3 moves forward in its slot C and causes the pawl lever 6*a* to rotate clockwise and out of the ratchet slot C in the bar 5. However, when the function lever 1 lies within the slot *a*, as shown in Fig. 3, the latching bar 5 is prevented from moving toward the right under the tension of spring 7 because the left-hand side of slot abuts against the left-hand side of lever 1 even though the pawl lever 6*a* is brought out of engagement with the ratchet tooth C by virtue of the operation of the function lever 3, as shown in Fig. 3. In the position of the latching bar 5, as shown in Fig. 3, the pawl lever 6*a* will not re-engage in the ratchet slot C since such slot is no longer in register with the pawl tooth 6. Thus, when the function lever 1 is finally retracted the latching bar 5 may move toward the right and normal position independent of the movement of the function lever 3 for locking.

Figure 4:
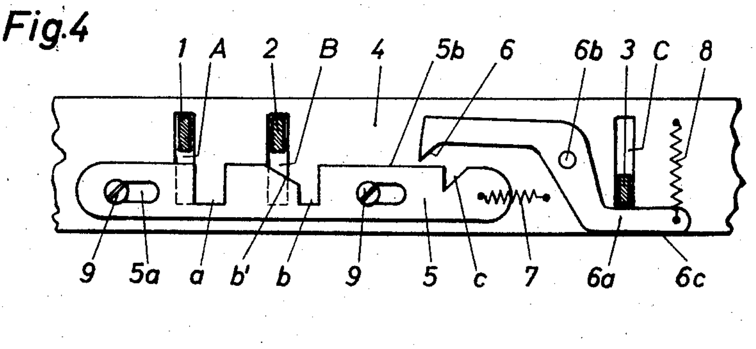
Fig. 4 is a schematic showing of the structure of Fig. 1 in the condition of having been reset to the position of Fig. 1.

Fig. 4 illustrates the position of the elements assumed upon the reception of any signal other than the signal corresponding to the line feed signal or the letter "D." Each signal is followed by the movement of the function lever 3, which pivots the pawl lever 6*a*, but since the latching bar 5 is in its right-hand position, this is of no effect. Assume, however, that the line feed signal is given incidental to the transmission. The movement of the function lever 2 will cause the movement of the latching bar 5 toward the lever as shown in Fig. 2 and the pawl tooth 6 will sit in the ratchet tooth C. Immediately upon the conclusion of the code combination, if the function lever 1 has not moved into the slot *a*, the function lever 3 will again pivot the pawl lever 6*a* clockwise and the latching bar 5 will assume the position shown in Fig. 4 and immediately thereafter upon the retraction of the function lever 3, the condition of Fig. 1 will be repeated.

By means of the arrangement shown, it is possible to achieve the situation whereby after the receipt of the code combination corresponding to a line feed signal (and the operation of the function lever 2) and the subsequent receipt of the code combination corresponding to the letter "D" the printing of the "D" subsequently to the engagement of the function lever 1 is suppressed and the switch-over of the two-way switch is achieved. If the next successive signal thereafter should be a "D," the character "D" will be printed because the function lever 1 due to the blocking of the downward path of lever 1, effected by the bar 5 (since both slots *a* and A are out of register), is prevented from engaging the slot *a* and the vanes. Thus, to print the letter "D" following a line feed function, there will be required to be received two successive code combinations corresponding to the letter "D"; the first being a necessary part of the switch-over of the motors M1, M2 and the second to actually cause the printing of the letter "D." If the code combination corresponding to the letter "D" follows any signal other than the signal corresponding to the line feed function, then the latching bar 5 will remain in the position shown in Fig. 1 will control printing of the letter "D" since the function lever 1 will be prevented from moving down the slot *a*.

If desired, it may be arranged to manually control the operation of the latching bar 5 to prevent the function lever 1 from functioning. In this case, the page printer will act like a normal page printer and operates in a manner similar to the operation of normal page printers with provision for the special function arrangement herein above described.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An arrangement in printing telegraph apparatus for performing an operation in response to the receipt of particular telegraph code combinations received in a predetermined order comprising at least three function levers, means for operating said levers in response to a corresponding code combination, means under control of a first one of said levers for performing two functions selectively in response to the same code combination, conditioning means under control of a second one of said levers for conditioning the operation of said first lever to perform a first one of its two functions, actuating means under control of said first lever for controlling performance of the first one of said functions upon receipt of the said same code combination, and means under control of the third lever for restoring said conditioning means whereafter said first lever will perform the other of its two functions upon receipt of said same code combination.

2. An arrangement as claimed in claim 1, wherein said means under control of said second function lever for conditioning operation of said first function lever comprises a movable latching bar under control of said second function lever, said latching bar normally adapted to prevent movement of said first function lever until moved by said second function lever.

3. An arrangement as claimed in claim 2, further comprising latching means for latching said latching bar in its actuated position whereby upon retraction of said second function lever to its normal position after receipt of its characteristic code combination, said latching bar remains in its actuated position.

4. An arrangement as claimed in claim 3, wherein each of said function levers have corresponding slots in which they are adapted to move upon receipt of its corresponding code combination, a latching bar having a first and second position, said second lever in its normal condition being positioned within its corresponding slot adjacent said latching bar when it is in its first position, said second lever when activated being adapted to cause said latching bar to move into its second position, said latching bar in its second position permitting said latching means to move into its activated state and condition said first lever, actuating means under control of said first lever to control the performance of said first function, and said latching means maintaining said latching bar in its second position when said second lever is returned to its normal condition.

5. An arrangement as claimed in claim 4 in which said third lever activates the restoring means in response to a corresponding code combination, said third lever in its activated position releasing said latching means and permitting said bar to be maintained in its second position by said first lever, means for returning said latching bar to its first position upon de-activation of said first lever, and said first lever now being conditioned to perform the other of its two functions upon receipt of a corresponding code combination.

References Cited in the file of this patent

UNITED STATES PATENTS

| | | |
|---|---|---|
| 1,878,152 | Klienschmidt | Sept. 20, 1932 |
| 2,590,421 | Lanza | Mar. 25, 1952 |